(12) United States Patent
Serlet

(10) Patent No.: US 9,183,212 B2
(45) Date of Patent: Nov. 10, 2015

(54) REPRESENTING DIRECTORY STRUCTURE IN CONTENT-ADDRESSABLE STORAGE SYSTEMS

(71) Applicant: upthere, inc., Palo Alto, CA (US)

(72) Inventor: Bertrand Serlet, Palo Alto, CA (US)

(73) Assignee: upthere, inc., Palo Alto, CA (US)

( * ) Notice: Subject to any disclaimer, the term of this patent is extended or adjusted under 35 U.S.C. 154(b) by 81 days.

(21) Appl. No.: 14/086,197

(22) Filed: Nov. 21, 2013

(65) Prior Publication Data

US 2015/0186393 A1    Jul. 2, 2015

Related U.S. Application Data

(63) Continuation-in-part of application No. 13/622,026, filed on Sep. 18, 2012, which is a continuation-in-part of application No. 13/358,742, filed on Jan. 26, 2012, now Pat. No. 8,631,209.

(51) Int. Cl.
*G06F 17/30* (2006.01)

(52) U.S. Cl.
CPC .... *G06F 17/30097* (2013.01); *G06F 17/30159* (2013.01); *G06F 17/30949* (2013.01)

(58) Field of Classification Search
CPC ............. G06F 17/30097; G06F 17/30159; G06F 17/30949
See application file for complete search history.

(56) References Cited

U.S. PATENT DOCUMENTS

| | | | |
|---|---|---|---|
| 6,807,632 B1 * | 10/2004 | Carpentier et al. | 713/165 |
| 7,535,485 B2 | 5/2009 | Elbaz et al. | |
| 8,156,429 B2 | 4/2012 | Lotenberg | |
| 8,223,191 B2 | 7/2012 | Elbaz et al. | |
| 2009/0228511 A1 * | 9/2009 | Atkin et al. | 707/102 |
| 2010/0058054 A1 | 3/2010 | Irvine | |
| 2010/0064354 A1 | 3/2010 | Irvine | |
| 2010/0070698 A1 | 3/2010 | Ungureanu et al. | |
| 2011/0010578 A1 | 1/2011 | Dominguez et al. | |
| 2011/0264871 A1 | 10/2011 | Koifman et al. | |

(Continued)

OTHER PUBLICATIONS

Ghemawat, Sanjay, "The Google File System", dated Oct. 2003, ACM, 15 pages.

(Continued)

*Primary Examiner* — Ryan Bertram
(74) *Attorney, Agent, or Firm* — Hickman Palermo Becker Bingham LLP; Ellen Y. Wei

(57) ABSTRACT

Techniques for representing directory structure in content-addressable storage systems are provided. A directory structure of a file system is represented using a plurality of chunks in a content-addressable storage system. The directory structure includes a set of objects arranged in an object hierarchy. The set of objects includes a particular directory that has, within the object hierarchy, a set of child objects. The plurality of chunks includes a directory object chunk for the particular directory. The plurality of chunks further includes a particular set of child object chunks. The particular set of child object chunks are object chunks for each child object in the set of child objects. The plurality of chunks further includes at least one hash set chunk with hash values for object chunks in the particular set of child object chunks.

24 Claims, 8 Drawing Sheets

(56) References Cited

U.S. PATENT DOCUMENTS

| | | |
|---|---|---|
| 2011/0307447 A1 | 12/2011 | Sabaa et al. |
| 2012/0210120 A1 | 8/2012 | Irvine |
| 2012/0215980 A1 | 8/2012 | Auchmoody et al. |
| 2012/0221524 A1 | 8/2012 | Auchmoody et al. |
| 2012/0300676 A1 | 11/2012 | Welin et al. |
| 2012/0311339 A1 | 12/2012 | Irvine |
| 2013/0061049 A1 | 3/2013 | Irvine |
| 2013/0198462 A1 | 8/2013 | Serlet et al. |
| 2013/0198475 A1 | 8/2013 | Serlet et al. |
| 2014/0189270 A1* | 7/2014 | Iwanicki et al. .............. 711/162 |
| 2015/0026454 A1* | 1/2015 | Boeuf et al. .................. 713/152 |

OTHER PUBLICATIONS

"Distributed Hash Table—Wikipedia, the free encyclopedia" downloaded from the Internet: http://web.archive.org/web/20120103125147/http:/en.wikipedia.org/wiki/Distributed hash . . . Dec. 2011 (5 pages).

"Designing Rhino DHT—A fault tolerant, dynamically distributed, hash table—Ayende@ . . . " http:/web.archive.org//20120122041007/http:/ayende.com/blog/3934/designing-rhino- . . . 2009 (9 pages).

Zhao, J. et al., "Achieving Reliability Through Reputation in a Wide-Area Network PHT Storage System" 2007 (8 pages).

* cited by examiner

REPRESENTING DIRECTORY STRUCTURE IN CONTENT-ADDRESSABLE STORAGE SYSTEMS

CROSS-REFERENCE TO RELATED APPLICATIONS; BENEFIT CLAIM

This application claims the benefit as a Continuation-in-part of U.S. patent application Ser. No. 13/622,026, filed Sep. 18, 2012, which is a Continuation-in-part of U.S. patent application Ser. No. 13/358,742, filed Jan. 26, 2012, the entire contents of which are hereby incorporated by reference as if fully set forth herein.

FIELD OF THE INVENTION

The present invention relates to storage systems and, more specifically, to techniques for representing directory structure in hierarchical content-addressable storage systems.

BACKGROUND

In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system.

Because conventional access keys are based on the location of the items being retrieved, the access keys change when the items are moved within a directory structure of a file system. In addition, each copy of an item has a different access key, because each copy is stored at a different location. On the other hand, when the content of the item is changed, the access key remains the same.

In contrast to conventional file systems, content-addressable storage systems allow applications to retrieve items from storage based on data that is generated from the content of the items, such as a hash value for the content. Because content-addressable storage systems perform storage-related operations on items based on the hash values generated for the items, and the hash values are based on the content of the items rather than where the items are stored, the applications that request the operations may do so without knowing the number or location of the stored copies of the items. For example, a content-addressable storage system may store multiple copies of an item X at locations A, B and C. An application that desires to retrieve item X would do so by sending a request with a hash value based on the contents of item X. Based on that hash value, the content-addressable storage system would provide to the application a copy of item X retrieved from one of the locations A, B, and C. Thus, the application would obtain item X without knowing where item X was actually stored, how many copies of item X existed, or the specific location from which the retrieved copy was actually obtained.

A chunk storage system is a storage system that performs storage operations without understanding the format or content of the digital information itself. Such storage systems are referred to as chunk storage systems because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as content-addressable storage systems. For example, a chunk storage system may generate a hash value for a chunk by applying a cryptographic hash function (e.g. MD5, SHA-1 or SHA2) to the chunk. The chunk store may then store the chunk, and maintain indexing data that associates the hash value with the location at which the chunk is stored.

When an application subsequently requests retrieval of the chunk, the application provides the hash value to the chunk storage system. The chunk storage system uses the indexing data to locate the chunk associated with the hash value, and provides the chunk thus located to the requesting application.

When an item is represented by one or more chunks in a content-addressable storage system, additional chunk/s must be added to the content-addressable storage system when the item is modified. Because the access key is based on the content, the access key for any chunk corresponding to the modified item will be different from the access key for a chunk corresponding to the original item. Furthermore, references to the original item, such as hash values or other access keys, with only be usable to access the original item.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for structuring a content-addressable storage system in a manner that reflects a file system directory structure. Chunks in the content-addressable storage system implement objects (e.g. files and directories) of the file system. For a particular directory containing a set of child objects, the content-addressable storage system includes a directory object chunk corresponding to the directory, a set of child object chunks corresponding to the child objects contained within the directory, and at least one hash set chunk containing hash values for child object chunks. The directory may be accessed using a hash value for the directory object chunk.

Modifying a directory (such as by adding a child object, modifying a child object, or removing a child object) causes the set of hash values for the child object chunks of the directory to change. When a directory is modified, one or more new hash set chunks are generated that include new hash values for new or modified child objects, or omit hash values for removed child objects.

In one embodiment, the hash set chunk/s are arranged in a hierarchy. A root hash set chunk is an ancestor of all other hash set chunks in the hierarchy of hash set chunks. When a child object is added, modified or removed from a directory, the change affects the hash set chunk referencing the child object, as well as ancestors of the affected hash set chunk.

Chunk Store Server

Figure 1:
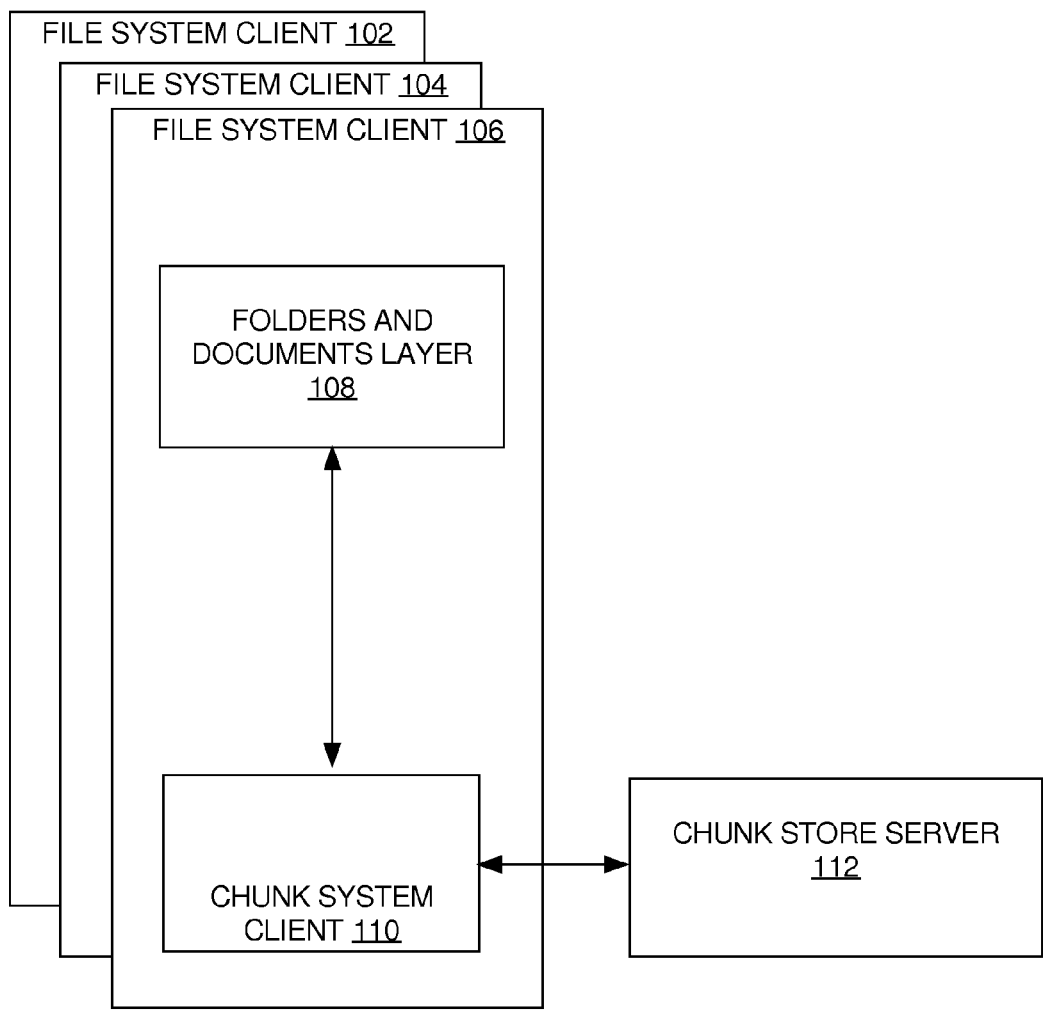
FIG. 1 is a block diagram depicting an embodiment of a system for representing directory structure in a content-addressable storage system.

FIG. 1 is a block diagram depicting an embodiment of a system for representing directory structure in a content-addressable storage system.

Chunk store server 112 is a content-addressable storage system configured to store a plurality of chunks. Although a single block is shown, chunk store server 112 may comprise any number of servers, data stores, network, or any other components suitable for implementing a data storage system. For example, chunk store server 112 may be a cloud storage server. In the embodiment illustrated in FIG. 1, chunk store server 112 is configured to communicate with one or more file system clients 102-106 over one or more networks, such as a cloud network.

Chunk store server 112 is configured to store chunks that are accessible using an access key based on the chunk content. The access key may be a hash value for the chunk data. In one embodiment, the hash function is an immutable hash function. That is, the application of the hash function to a given chunk always produces the same access key. Examples of hash functions that may be used for generating the access keys include, but are not limited to, MD5, SHA-1 and SHA-2. Although detailed embodiments are described that use hash values as access keys, any other content-based access key may be used with the described embodiments for representing directory structure in a content-addressable storage system.

File System Clients

File system clients 102-106 generally represent entities configured to store and access files in a file system implemented using chunk store server 112. Thus, file system clients 102-106 may correspond to applications, systems, services, or any other type of entity that makes use of a file system. Chunk store server 112 may store a plurality of file system volumes for one or more file system clients 102-106. Furthermore, each of file system clients 102-106 may access one or more file system volumes, and each file system volume may be accessed by one or more file system clients 102-106.

In one embodiment, file system client 106 includes a folders and documents layer 108 and a chunk system client 110. File system client 106 may access one or more file system volumes stored by chunk store server 112 through folders and documents layer 108. In one embodiment, folders and documents layer 108 allows users and applications of file system client 106 to access remotely stored file system volumes in a similar manner as a traditional file system. For example, folders and documents layer 108 may present a file system volume stored in chunk store server 112 as a set of folders and documents in a traditional hierarchical file system.

Folders and documents layer 108 communicates with chunk system client 110 to access data pertaining to a file system volume stored in chunk store server 112. Chunk system client 110 is configured to communicate with chunk store server 112 to access chunk data stored by chunk store server 112. In one embodiment, chunk system client 110 is configured to communicate with chunk store server 112 over one or more networks, such as a cloud network. In one embodiment, chunk system client 110 is further configured to construct the directory structure of one or more directories of a file system volume based on chunks retrieved from chunk store server 112.

For the purpose of explanation, internal functional units of file system client 106 are illustrated in detail. While not separately illustrated, file system clients 102 and 104 may have the same or similar components as file system client 106.

File System Volume

Chunks may be used to represent a file system hierarchy of a volume, where some chunks correspond to folders/directories of the file system hierarchy, and other chunks correspond to files that are stored in those folders/directories. Content-addressable storage systems are typically immutable. Once a chunk of data is stored in association with an access key, such as the hash value of the chunk, the chunk of data cannot be directly modified at the access key location. Rather, a new version of the chunk is created, and the new version is stored separately from the original copy of the chunk. Further, data is stored to associate the location of the new chunk with a new access key, where the new access key is based on the content of the modified chunk. To represent directory structure of a file system, which is typically mutable, these access key changes must be taken into account.

Figure 2:
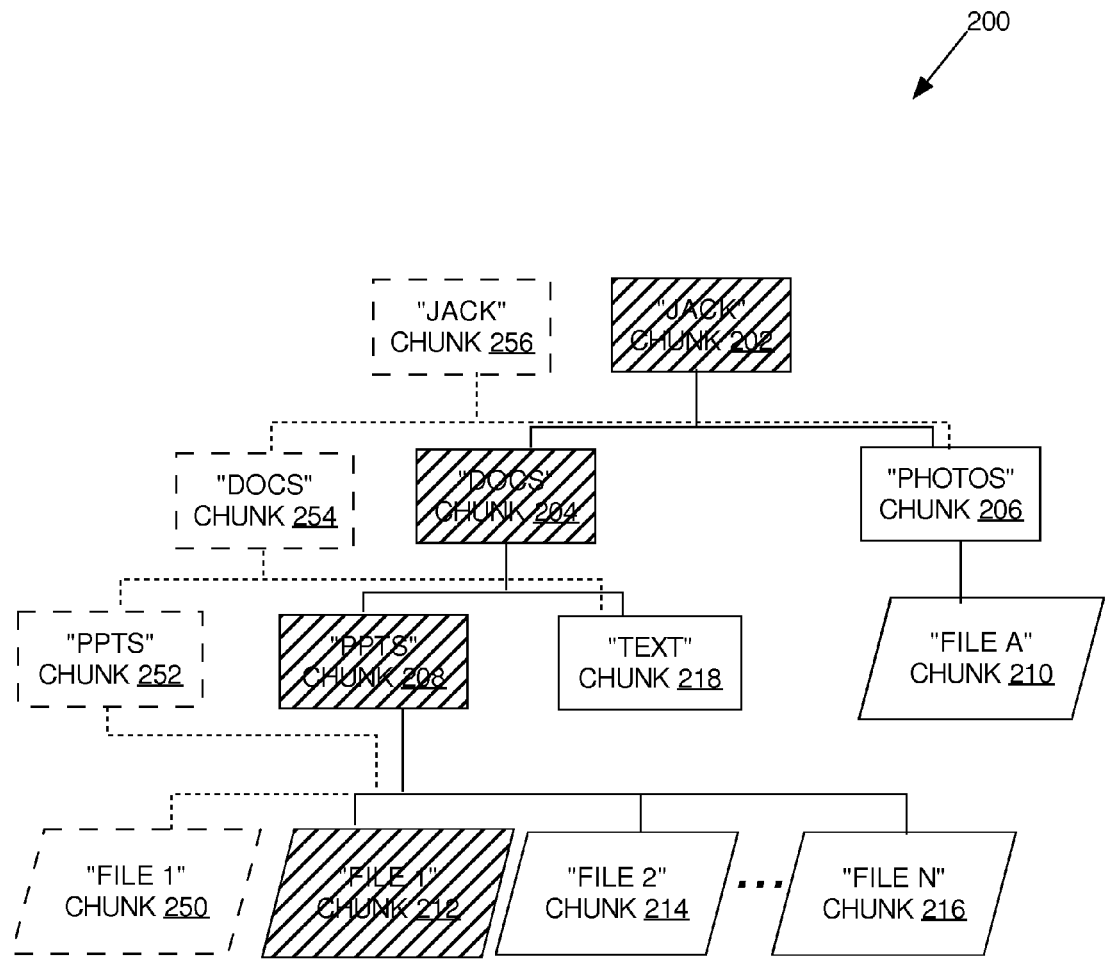
FIG. 2 is a block diagram depicting an embodiment of object chunks corresponding to a file system volume.

FIG. 2 is a block diagram depicting object chunks 202-256 corresponding to objects, such as files and directories, in a file system volume. Object chunks 202-256 include directory object chunks 202-208 and 252-256 that correspond to directories, and file object chunks 210-218 and 250 that correspond to files. As used herein, the term "file" refers to any non-directory data that may be associated with an access key, such as the pathname, in a typical file system.

While the arrangement of object chunks in file system hierarchy 200 reflects the hierarchical relationship between the directories and files to which the object chunks correspond, the actual arrangement of the object chunks within a chunk store may have no relationship to that hierarchy. For example, the object chunks may be distributed across multiple storage devices, such as in a cloud storage system.

File system hierarchy 200 represents directory structure within the file system volume. As illustrated in FIG. 2, file system hierarchy 200 is a tree with no overlapping structures. As used herein, the term "hierarchy" includes but is not limited to a tree. For example, it is also possible for any given object chunk or sub-hierarchy of object chunks to belong to multiple sub-hierarchies within file system hierarchy 200. It is also possible for any of the object chunks or sub-hierarchy of object chunks to belong to a different file system hierarchy for a different file system volume. More generally, file system hierarchy 200 may be a directed acyclic graph. A directed acyclic graph may also represent multiple file system hierarchies that potentially share one or more object chunks. The techniques described herein are equally applicable to chunk stores that represent such hierarchies as chunk stores that represent non-overlapping tree hierarchies.

File system hierarchy 200 includes object chunks 202-218 arranged in a manner that reflects the hierarchical relationship between the objects stored in the file system volume. A non-leaf object chunk in file system hierarchy 200 corresponds to a non-empty directory of the file system volume. A leaf object chunk in file system hierarchy 200 corresponds to a file or an empty directory of the file system volume. For example, as indicated by file system hierarchy 200, files "FILE 1"-"FILE N" (corresponding to object chunks 212-216) reside in the directory "PPTS" (corresponding to directory object chunk 208). The directory "PPTS" is a child of the directory "DOCS" (corresponding to directory object chunk 204), which in turn is a child of the directory "JACK" (corresponding to directory object chunk 202), which is the root directory of file system volume 200. Object chunk 202 is a root object chunk of the hierarchy corresponding to the volume 200. The entire file system volume may be accessed using the hash value of root object chunk 202.

In a file system, a directory may contain, as child objects, both files as well as directories. For example, directory "DOCS" (corresponding to directory object chunk 204) includes both a folder "PPTS" (corresponding to directory object chunk 208) and a file "TEXT" (corresponding to object chunk 218).

When a file system hierarchy is implemented using a chunk store, the addition, modification or removal of a single file may necessitate changes to every file that is above that file in the hierarchy. Specifically, because the files are implemented by object chunks that are addressed based on content, the modification of the single file causes creation of new directory object chunks for every directory that is above the file in the file system hierarchy, since the respective hash values referenced in the ancestor directory object chunks must be updated.

For example, assume that an authorized user of the file system volume modifies "FILE 1" (corresponding to object chunk 212). Because the modification to "FILE 1" changes the content of the object chunk, and chunks are addressed based on content in the content-addressable storage system, the modified data is not simply stored over object chunk 212 (corresponding to the previous version of "FILE 1"). Rather, the a new object chunk 250 corresponding to the modified version of "FILE 1" is generated and stored in the content-addressable storage system. New object chunk 250 is stored separately from object chunk 212.

Because the current version of "FILE 1" corresponds to new object chunk 250, directory object chunk 208 (corresponding to the parent directory "PPTS") must also be updated to point to the new object chunk 254 the current version of "FILE 1". To update the directory "PPTS" in file system hierarchy 200, a new directory object chunk 252 is generated and stored. The new directory object chunk 252 (corresponding to the updated version of directory "PPTS") points to object chunk 254 (corresponding to the updated version of "FILE 1") and does not point to object chunk 212 (corresponding to the previous version of "FILE 1"). Similarly, the original directory object chunk 204 (corresponding to directory "DOCS") must also be updated to point to the new chunk for the "PPTS" directory. To update the directory "DOCS", a new directory object chunk 254 is generated and stored for directory "DOCS". For similar reasons, new directory object chunk 256 is stored for the root directory "JACK" that is the parent of "DOCS". After the modification of "FILE 1", the new directory object chunk 256 is used to access the entire file system volume.

As a consequence of the modification to "FILE 1", several chunks have become "stale". A stale chunk is a chunk whose data no longer reflects the current state of the file system. In the example given above, the update to "FILE 1" causes object chunks 212, 208, 204 and 202 to become stale. The more updates that are performed, the more chunks become stale.

Additional chunks corresponding to individual files and directories may also be generated and stored in a content-addressable storage system, which are omitted in FIG. 2. Examples of additional chunks are provided in FIGS. 3A-3D. For example, hierarchy data and/or indexing data may be stored as separate chunks. When these additional chunks are affected by modifications, they may also become stale.

Directory Object Chunk

A directory structure of a file system includes a set of objects arranged in an object hierarchy. The object hierarchy typically includes a root directory and child objects contained within the root directory. The child objects may be file objects or other directory objects. The other directory objects may themselves have child objects. Thus, there is no inherent limit on the number of levels of directories within the directory structure.

Figure 3A:
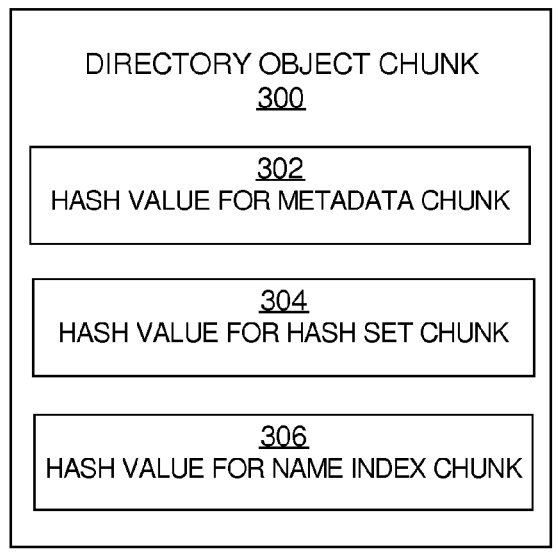
FIG. 3A is a block diagram depicting an embodiment of a directory object chunk.
Figure 3B:
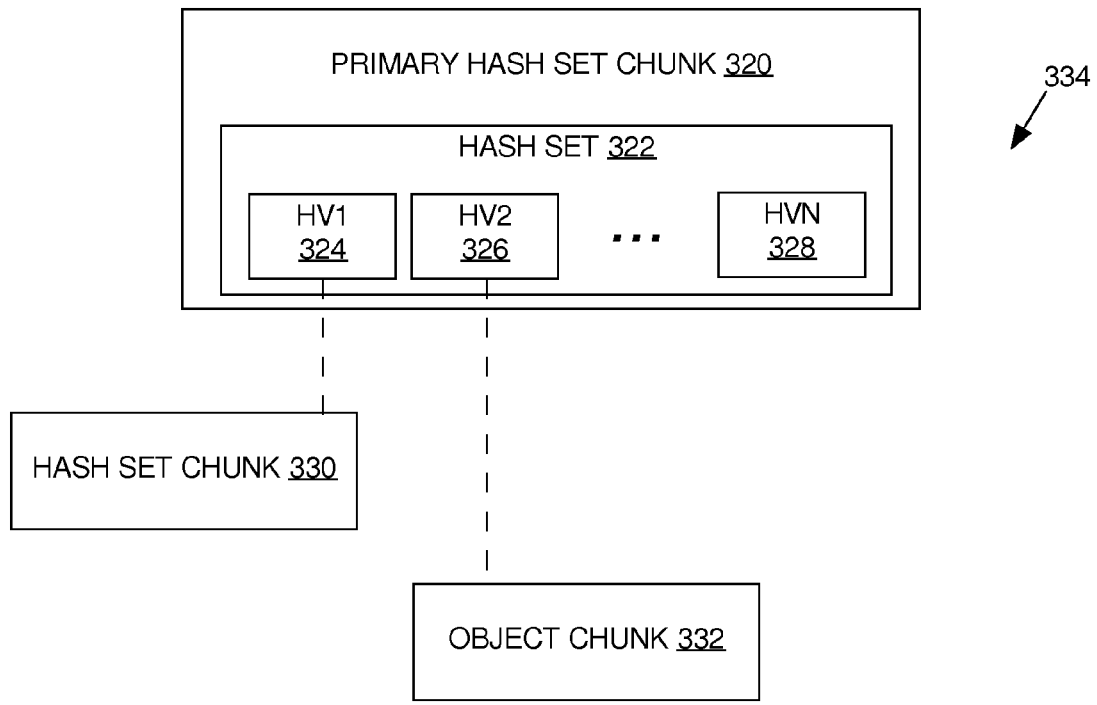
FIG. 3B is a block diagram depicting an embodiment of a hierarchy of hash set chunks.

A directory object chunk is stored in the content-addressable storage system to represent a directory of a file system. FIG. 3A is a block diagram depicting a directory object chunk 300, according to one embodiment. For the purpose of explanation, it shall be assumed that directory object chunk 300 represents a directory X in the file system. According to one embodiment, a directory object chunk includes:

a hash value for metadata chunk a hash value for a hash set chunk, and a hash value for a name index chunk Each of these hash values, and the chunks to which the hash values correspond, shall be described in greater detail hereafter.

Object Chunks

Figure 3C:
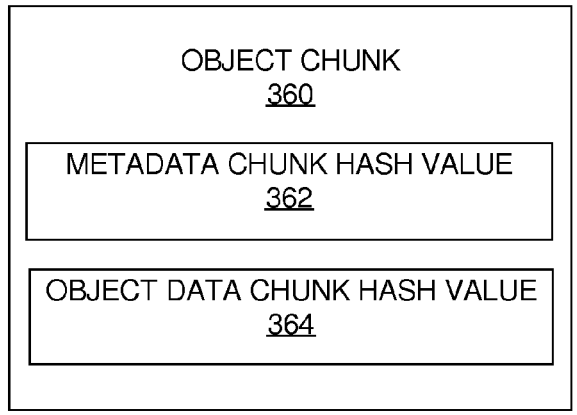
FIG. 3C is a block diagram depicting an embodiment of an object chunk.
Figure 3D:
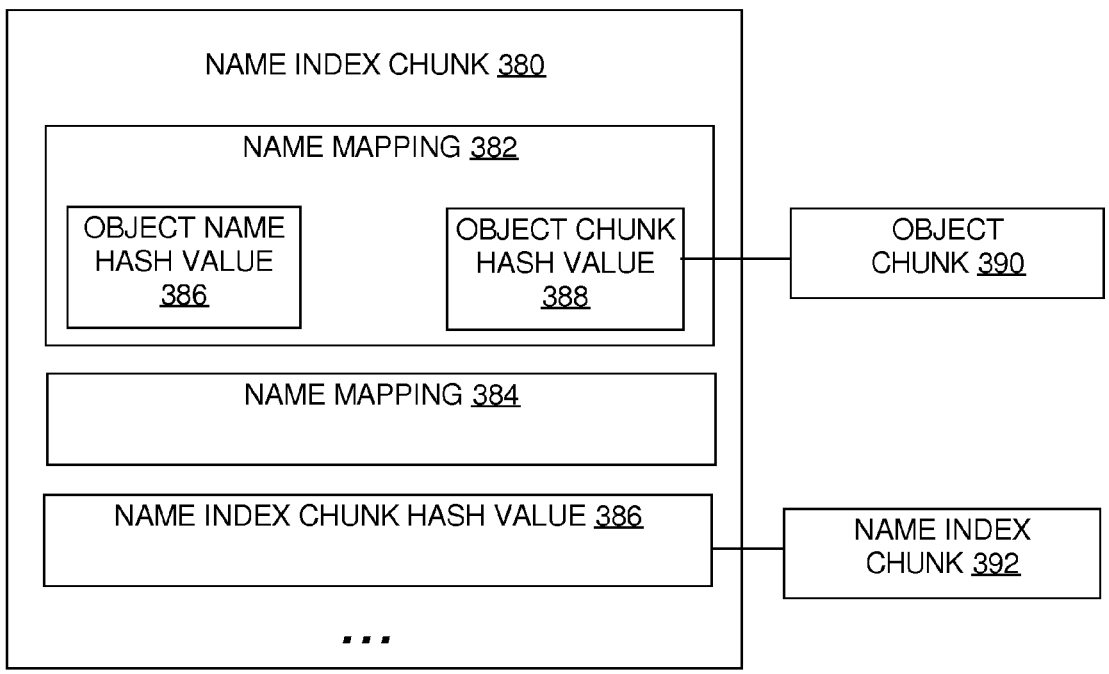
FIG. 3D is a block diagram depicting an embodiment of a name index chunk.

FIG. 3C is a block diagram depicting an embodiment of an object chunk. Object chunk 360 is stored in the content-addressable storage system. Object chunk 360 corresponds to a non-directory object, such as a file. Object chunk 360 may include a hash value 362 to a metadata chunk. Metadata corresponding to the file may be stored as a separate metadata chunk in the content-addressable storage system. Hash value 362 is a hash value for the metadata chunk. Inclusion of have value 362 in object chunk 360 associates object chunk 360 with the separate metadata chunk corresponding to the file. Additional hash values corresponding to other metadata chunks associated with the file may be stored in object chunk 360 or metadata chunk 362.

Object data corresponding to the file may be stored as a separate data chunk in the content-addressable storage system. Hash value 364 is a hash value for the data chunk associated with object chunk 360. Inclusion of hash value 364 in object chunk 360 associates object chunk 360 with the separate data chunk corresponding to the file. Additional hash values corresponding to other data chunks associated with the file may be stored in object chunk 360 or data chunk 364. In one embodiment, large files are divided into multiple data chunks, which may be referenced and/or indexed in object chunk 360 or an intermediate chunk type.

In an alternate embodiment, the data and/or any metadata for a file may be directly stored in object chunk 360.

Metadata Chunks

Metadata corresponding to directory X may be stored in a separate metadata chunk in the content-addressable storage system. In the illustrated embodiment, directory object chunk 300 includes a hash value 302 of a corresponding metadata chunk. Hash value 302 is a hash value for the metadata chunk associated with directory object chunk 300. Additional hash values corresponding to other metadata chunks associated with the directory may be stored in directory object chunk 300 or the metadata chunk corresponding to hash value 302.

Hash Set Chunks

The directory X of the file system may include zero or more child objects, such as files and/or directories. The child objects are stored as a set of child object chunks in the content-addressable storage system.

The set of child object chunks for directory X are associated with the directory object chunk 300 for directory X. Specifically, the child object chunks may be associated with directory object chunk 300 using hash values for the child object chunks. In one embodiment, hash values for the one or more child object chunk are stored in one or more hash set chunks. An embodiment of a hash set chunk is described in FIG. 3B.

In the embodiment illustrated in FIG. 3A, directory object chunk 300 includes a hash value 304 to a primary hash set chunk which may itself be the root of a hierarchy of hash set chunks. The root hash set chunk is an ancestor of all other hash set chunks in the hierarchy of hash set chunks. In an alternate embodiment, directory object chunk 300 may directly include a root hash set instead of the hash value 304 for the root hash set chunk.

As mentioned above, FIG. 3B is a block diagram depicting an embodiment of a hash set chunk. For a particular directory, at least one hash set chunk contains hash values for object chunks in the set of child object chunks corresponding to child objects of the corresponding directory. Primary hash set chunk 320 and any additional hash set chunks 330 are stored in the content-addressable storage system.

When exactly one hash set chunk is stored for a directory, the corresponding directory object chunk may include a primary hash set chunk hash value 304 for a primary hash set chunk 320, where the primary hash set chunk 320 contains hash set 322. Hash set 322 includes hash values 324-328 for each child object chunk 332 corresponding to child objects of the directory. Hash set 322 may include no hash values when the directory is empty. Directory access, or access to an object in the directory, may be obtained by:
- retrieving directory object chunk 300 using a hash value for directory object chunk 300;
- retrieving primary hash set chunk 320 using primary hash set chunk hash value 304; and
- retrieving data corresponding to the set of child objects using hash values 324-328 of primary hash set chunk 320.

When a directory does not contain any child objects, primary hash set chunk 320 may have an empty hash set 322, or may otherwise indicate that the particular directory does not contain any child objects. Alternatively, the directory object chunk 300 corresponding to the empty directory may store a null value for primary hash set chunk hash value 304, or may otherwise represent that no primary hash set chunk is associated with the empty directory.

Hierarchy of Hash Set Chunks

When more than one hash set chunk is stored for a directory, the one or more hash set chunks may be arranged in a hierarchy of hash set chunks, where primary hash set chunk 320 is a root hash set chunk of the hierarchy of hash set chunks. The root hash set chunk is an ancestor of all other hash set chunks in the hierarchy of hash set chunks. In one embodiment, each hash set chunk in the hierarchy of hash set chunks includes a set of hash values, where each hash value is for either:
- an object chunk 332 in the set of child object chunks; or
- another hash set chunk 330 in the hierarchy of hash set chunks.

In one embodiment, each hash set chunk in the hierarchy may contain up to a threshold number of hash values. If the threshold value will be exceeded when a hash value is inserted, the hierarchy of hash set chunks may be reconfigured. This case is explained in further detail below in the section entitled "Hierarchy Structure".

Modifying Hash Set Chunks to Reflect Directory Changes

When a directory is modified, such as by adding a child object, modifying a child object, or removing a child object, the set of hash values for the child object chunks of the directory chunk will change. For example:
- a hash value is added when a child object is added to the directory;
- a hash value is added and another hash value is removed when a child object is modified; and
- a hash value is removed when a child object is removed from the directory.

When the set of hash values changes, one or more hash set chunks associated with the directory will also change to reflect any changes to the set of hash values for child object chunks. A selected hash value may be added to a specific hash set chunk by generating a new version of the specific hash set chunk containing the selected hash value. A selected hash value may be removed from a specific hash set chunk by generating a new version of the specific hash set chunk without the selected hash value.

When exactly one hash set chunk is stored for a directory, primary hash set chunk 320 is the specific hash set chunk, and a new version of primary hash set chunk 320 is generated and stored for each directory modification (e.g. adding a child object, modifying a child object, or removing a child object). In this case, the new version of primary hash set chunk 320 will contain each hash value for the set of child object chunks. All of the hash value data for the child object chunks will be duplicated for every directory modification.

When more than one hash set chunk is stored for a directory, such as in a hierarchy of hash set chunks, a new version of more than one hash set chunk may be generated and stored for each directory modification. In addition to a new version of a specific hash set chunk from which a hash value is added or removed, a new version is generated and stored for any ancestor hash chunk in the hierarchy of hash set chunks. A new root hash set chunk, which is considered the primary hash set chunk, is also generated since the root hash set chunk is an ancestor of every other hash set chunk in the hierarchy of hash set chunks. The corresponding directory object chunk will reference the root hash set chunk, from which all other hash set chunks of the hierarchy are accessible. In this case, new versions are generated and stored for more hash set chunks, but less hash values will be duplicated for every directory modification. More specifically, non-ancestor hash set chunks in the hierarchy of hash set chunks do not need to be regenerated, so the hash values contained therein are not duplicated.

In both cases, a new primary hash set chunk is generated and stored in the content-addressable storage system. The hash value for the new primary hash set chunk will be different from the hash value for the original primary hash set chunk. Because directory object chunk 300 includes primary hash set chunk hash value 304, a new directory object chunk is also generated and stored in the content-addressable storage system. The new directory object chunk includes a new primary hash set chunk hash value corresponding to the new primary hash set chunk. The directory is accessible using a hash value for the new directory chunk.

Name Index Chunks

A name index associates the names of child objects of a directory with the corresponding object chunks in the content-addressable storage system. The name index is an optional component that can speed up directory access operations within the content-addressable storage system. A name index may be stored as one or more name index chunks in the content-addressable storage system An embodiment of a name index chunk is described in FIG. 3D.

Directory object chunk 300 may include hash value 306 to a name index chunk. The hash value 306 associates directory object chunk 300 with one or more name index chunks. For example, the one or more name index chunks may be arranged in a hierarchy of name index chunks, where a primary name index chunk is a root name index chunk. The root name index chunk is an ancestor of all other name index chunks in the hierarchy of name index chunks. In an alternate embodiment, directory object chunk 300 may directly include a root name index instead of a hash value for the root hash set chunk.

As mentioned above, FIG. 3D is a block diagram depicting an embodiment of a name index chunk. Name index chunk 380 is stored in the content-addressable storage system. A name index associates the names of child objects of a directory with the corresponding object chunks in the content-addressable storage system. For example, name index chunk 380 may include one or more name mappings 382-384. Each name mapping associates the name of a child object of a directory with the corresponding object chunk.

In one embodiment, each name mapping 382-384 maps an object name hash value 386 to an object chunk hash value 388. The name mappings 382-384 enable quick access to object chunk 390 given the name of the child object and the directory object chunk 300 for the directory containing the child object. Access may be obtained by:
retrieving the name index chunk 380 using the name index chunk hash value 306 of directory object chunk 300;
generating a hash value 386 of the name of the child object;
obtaining object chunk hash value 388 using object name hash value 386 and the associated name mapping 382; and
retrieving object chunk 390 using object chunk hash value 388.

Hierarchy of Name Index Chunks

Although the hierarchy structure is described in detail with respect to a hierarchy of hash set chunks corresponding to a directory, the hierarchy structure is equally applicable to a hierarchy of name index chunks corresponding to the directory.

In one embodiment, the name index is stored in one or more name index chunks may be arranged in a hierarchy of name index chunks, where a primary name index chunk is a root name index chunk. The root name index chunk is an ancestor of all other name index chunks in the hierarchy of name index chunks. For example, name index chunk hash value 306 of directory object chunk 300 may be a hash value for a primary name index chunk that is a root name index chunk in a hierarchy of name index chunks.

The root name index chunk is an ancestor of all other name index chunks in the hierarchy of name index chunks. In one embodiment, a name index chunk 380 in the hierarchy of name index chunks may include hash value/s 386 for other name index chunk/s 392 in the hierarchy of name index chunks.

Modifying Name Index Chunks to Reflect Directory Changes

When a directory is modified, such as by adding a child object, modifying a child object, or removing a child object, the set of mappings in that name index will change. For example, when a child object is added to the directory, a new mapping associating the name of the child object to the hash value of the new object chunk is added to the name index. When a child object is removed from the directory, the mapping associating the name of the child object to the hash value of the associated object chunk is removed. When a child object in the directory is modified, a new mapping is added, and the prior mapping is removed.

When exactly one name index chunk is stored for a directory, a new version of name index chunk 382 is generated and stored for each directory modification. In this case, the new version of the name index chunk will contain each mapping for the set of child object chunks. All of the mapping data for the child object chunks will be duplicated for every directory modification.

When more than one name index chunk is stored for a directory, such as in a hierarchy of name index chunks, a new version of more than one name index chunk may be generated and stored for each directory modification. In addition to a new version of a specific name index chunk from which a mapping is added or removed, a new version is generated and stored for any ancestor name index chunk in the hierarchy of name index chunks. A new root name index chunk, which is considered the primary name index chunk, is also generated since the root name index chunk is an ancestor of every other name index chunk in the hierarchy of name index chunks. The corresponding directory object chunk will reference the root name index chunk, from which all other name index chunks of the hierarchy are accessible. In this case, new versions are generated and stored for more name index chunks, but less mappings will be duplicated for every directory modification. More specifically, non-ancestor name index chunks in the hierarchy of name index chunks do not need to be regenerated, so the mappings contained therein are not duplicated.

In both cases, a directory object chunk 300 that includes the new name index chunk hash value 306 is generated and stored in the content-addressable storage system. The directory is accessible using a hash value for the new directory chunk. In one embodiment, directory structure is implemented in a content-addressable storage system using both a hierarchy of hash set chunks and a hierarchy of name index chunks, and a new directory object chunk is generated once, where the new directory object chunk contains both a new primary hash set chunk hash value 304 and a new primary name index chunk hash value 306.

Hierarchy Structure

Each hash set chunk in a hierarchy may contain up to a threshold number of hash values, i.e. a threshold value t. If the threshold value t will be exceeded when a hash value is inserted, the hierarchy of hash set chunks may be rebalanced or otherwise reconfigured. Reconfiguration of the hierarchy of hash chunks may be partial or complete. Reconfiguration involves generating new hash set chunks for every affected hash set chunk in the hierarchy, thereby duplicating hash value data stored in the content-addressable storage system. One or more embodiments may minimize or avoid complete reconfiguration of the hierarchy of hash chunks. For example, a perfect or quasi-perfect hash function may be used to generate hash values for object chunks. The assumption may be made that the hash values are distributed uniformly, thereby reducing or eliminating the need for reconfiguring the hierarchy of hash set chunks.

In one embodiment, the hierarchy of hash set chunks is configured such that a height of the hierarchy is n when the size of the set of objects is up to $t_n$, where t is the threshold value and where n is an integer greater than or equal to 1. The larger the threshold value t, the smaller the height of the hierarchy. For example, when the threshold value t is 256:

the height of the hierarchy is 1 when the size of the set of objects is up to 255;

the height of the hierarchy is 2 when the size of the set of objects is up to 65,535;

the height of the hierarchy is 3 when the size of the set of objects is up to 16,777,215; etc.

In one embodiment, the height of the hierarchy n is equal to $\log_t(N)$, rounded up to the next integer, where N is the number of hash values stored in the hierarchy. The height of the hierarchy is related to the number of hash set chunks that need to be changed for each modification to the directory. Typically, the number of hash set chunks that need to be changed is n. For example, when the threshold value t is 256, we can expect the generation and storage of:

1 new hash set chunk when the size of the set of objects is up to 255;

2 new hash set chunks when the size of the set of objects is up to 65,535;

3 new hash set chunks when the size of the set of objects is up to 16,777,215; etc.

When a quasi-perfect hash function is used in the content-addressable storage system, these bounds are reliable and exact. This allows for file system operations to be carried out in constant time.

In addition to the number of hash set chunks that need to be changed, the size of each hash set chunks changed is also a consideration. For example, if the height of the hierarchy is one, even though only one hash set chunk is duplicated, that hash set chunk contains every hash set value of every child object in the associated directory. For each hash set chunk, the size of the hash set chunk is limited by the threshold value t. More specifically, the size of the hash values contained in the hash set chunk will be up to (size of each hash value)×t. For example, if the size of each hash value is 32 bytes, and the threshold value t is 256, then each hash set chunk stores up to 256*32 bytes=8 KB of hash values.

The hierarchy may be configured such that one or more directory operations may be performed in effectively constant time. For example, to access an object in a directory (i.e. obtain a hash value for the respective object chunk), the processing time is on the order of $\log_t N$, where t is the threshold value and N is the total number of hash values for the directory. As noted above, the hierarchy can be configured such that $\log_t N$ is a small constant. Furthermore, to modify an object in the directory (i.e. generate new chunks containing updated hash values), the processing time is also on the order of $\log_t N$, which may be a small constant for very large N.

In one embodiment, bit values of the hash value may be used to determine the hierarchy structure. When the threshold value t is 256, a specific byte of the hash value may be used to split the hash values that each level of the hierarchy. For example, bit values for a first byte of a hash value may be used to split hash values for a first level of the hierarchy, bit values for a second byte of the hash value may be used to split hash values for a second level of the hierarchy, and so on.

In one embodiment, a partial reconfiguration is performed when the number of hash values in a specific hash set chunk exceeds the threshold value t. For example, threshold may be exceeded when a hash value is added to the specific hash sets chunk without removing a hash value from the same hash set chunk. For example, the partial reconfiguration may be performed by extending the hierarchy. The new hash value is added to a receiving hash set chunk, which is a child of a new immediate parent hash set chunk that replaces the specific hash set chunk in the hierarchy. The new immediate parent hash set chunk is also an ancestor of at least one sibling hash set chunk of the receiving hash set chunk. For unmodified child objects, the child chunks of the new immediate parent hash set chunk includes all of the child object hash values contained in the original specific hash set chunk.

Although hierarchy structure is described in detail with respect to hash set chunks, the concepts are equally applicable to a hierarchy of name index chunks corresponding to a directory.

Updating the Hash Set Chunk Hierarchy

Figure 4:
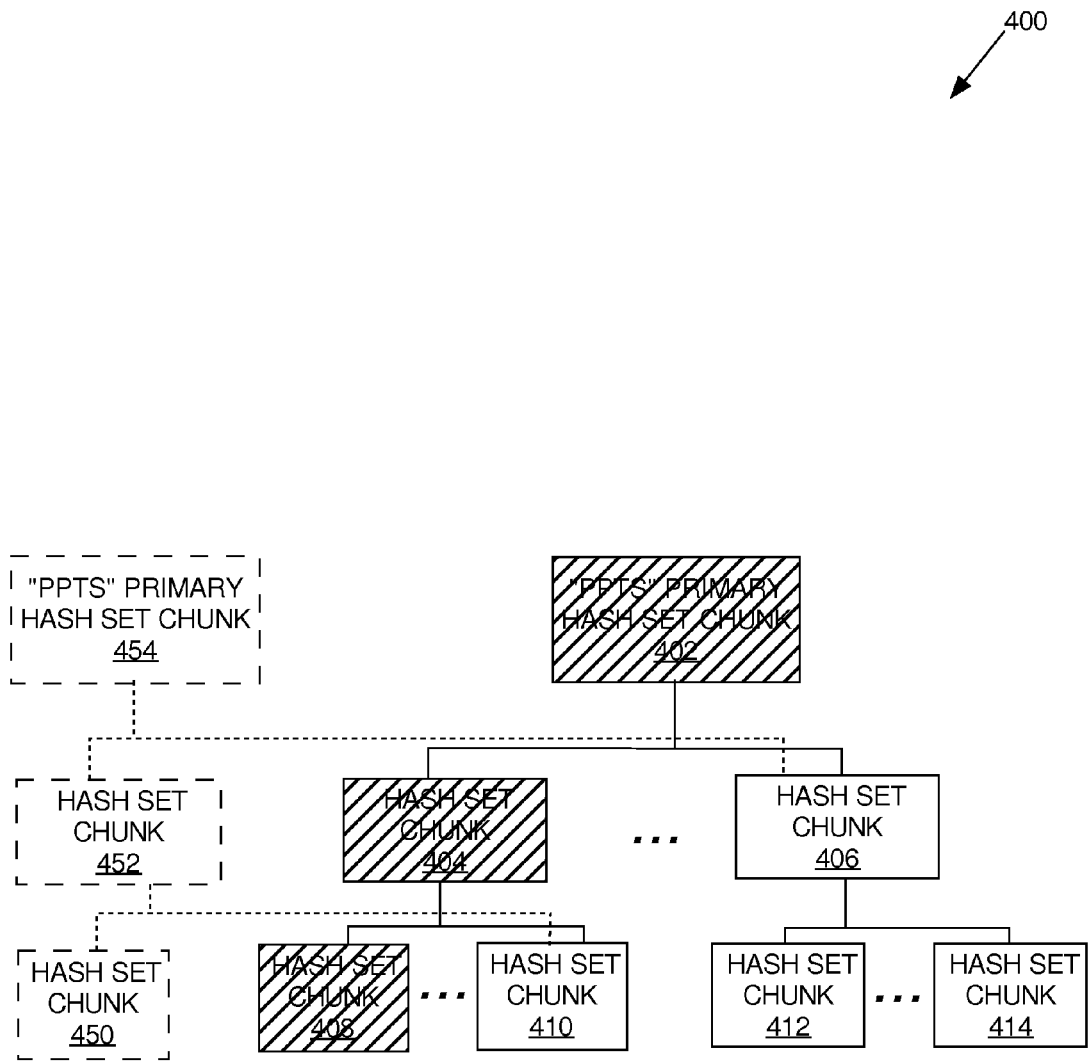
FIG. 4 is a block diagram depicting an embodiment of hash set chunks corresponding to a particular directory of a file system volume.

FIG. 4 is a block diagram depicting an embodiment of hash set chunks corresponding to a particular directory of a file system volume. Hash set chunk hierarchy 400 corresponds to a particular directory in a file system hierarchy. In this example, hash set chunk hierarchy 400 corresponds to directory "PPTS" in file system hierarchy 200. This association may be stored in a hash set chunk hash value 304 of the directory object chunk 300. In this case, directory object chunk 208 (corresponding to directory "PPTS") includes a hash value for primary hash set chunk 402.

Hash set chunk hierarchy 400 includes a set of hash set chunks 402-414, which contain hash values for object chunks corresponding to child objects of the corresponding directory. Primary hash set chunk 402 is a root hash set chunk of hash set chunk hierarchy 400, and is an ancestor of all other hash set chunks in hash set chunk hierarchy 400. Each hash set chunk 402-414 includes a set of hash values, where each hash value is for either another hash set chunk in hash set chunk hierarchy 400, or an object chunk 212-216 corresponding to files "FILE1"-"FILE N" in directory "PPTS".

When directory "PPTS" is modified, such as by adding a child object, modifying a child object, or removing a child object, the set of hash values for the child object chunks of the directory chunk will change, and hash set chunk hierarchy 400 will be updated to reflect the change. To update hash set chunk hierarchy 400, one or more new hash set chunks 450-454 must be generated to reflect any changes to the set of hash values for child object chunks contained in the associated directory. For example, the modification of "FILE 1" in directory "PPTS" shown in FIG. 2 caused object chunk 250 to be generated and stored. The hash value stored for "FILE 1" in hash set chunk hierarchy 400 must be updated from the hash value for object chunk 212 to the hash value for object chunk 250. In the example, the hash value for object chunk 212 (corresponding to the prior version of "FILE 1") is stored in hash set chunk 408. After the modification of "FILE 1", hash set chunk hierarchy 400 should no longer refer to object chunk 212, and should instead refer to object chunk 250.

In the example shown, the hash value for object chunk 212 is stored in hash set chunk 408. A new hash set chunk 450 is generated to replace hash set chunk 408 in hash set chunk hierarchy 400. The new hash set chunk 450 includes the hash value for object chunk 250 and omits the hash value for object chunk 212. At this point, hash set chunk 408 is considered stale. In one embodiment, a new hash set chunk 450 is generated by copying hash values in hash set chunk 408, adding the hash value for object chunk 250, and omitting the hash value for object chunk 212. In other embodiments, hash values contained in hash set chunk hierarchy 400 may be reassigned in another manner. Furthermore, although adding and removing the respective hash values from the same new hash set chunk 450 generally reduces data duplication in the content-addressable storage system, it is not a requirement for every embodiment or every case within an embodiment.

Stale hash set chunk 408 has ancestor hash set chunks 402-404. Because ancestor hash set chunk 404 includes a hash value for stale hash set chunk 408, a new hash set chunk 452 is generated that includes the hash value for new hash set chunk 450 and omits the hash value for stale hash set chunk 408. Similarly, new primary hash set chunk 454 is generated that includes the hash value for new hash set chunk 452 and omits the hash value for stale hash set chunk 404. The hash value for the new primary hash set chunk 454 will be different from the hash value for the original primary hash set chunk 402. A prior version of directory object chunk 208 (corresponding to directory "PPTS") is also stale, because the directory object chunk 208 includes a primary hash set chunk hash value for primary hash set chunk 402. The new directory object chunk 252 for the "PPTS" directory includes a primary hash set chunk hash value for new primary hash set chunk 454. In the illustrated embodiment, three new hash set chunks are generated and stored, even if hash set chunk hierarchy 400 contains a very large number of hash values and/or a very large number of hash set chunks (e.g. up to about 17 million hash values and about 70,000 hash set chunks in one embodiment).

Although hierarchy structure is described in detail with respect to hash set chunks in FIG. 4, the hierarchy structure shown is equally applicable to a hierarchy of name index chunks corresponding to the directory.

Accessing a Directory

Figure 5:
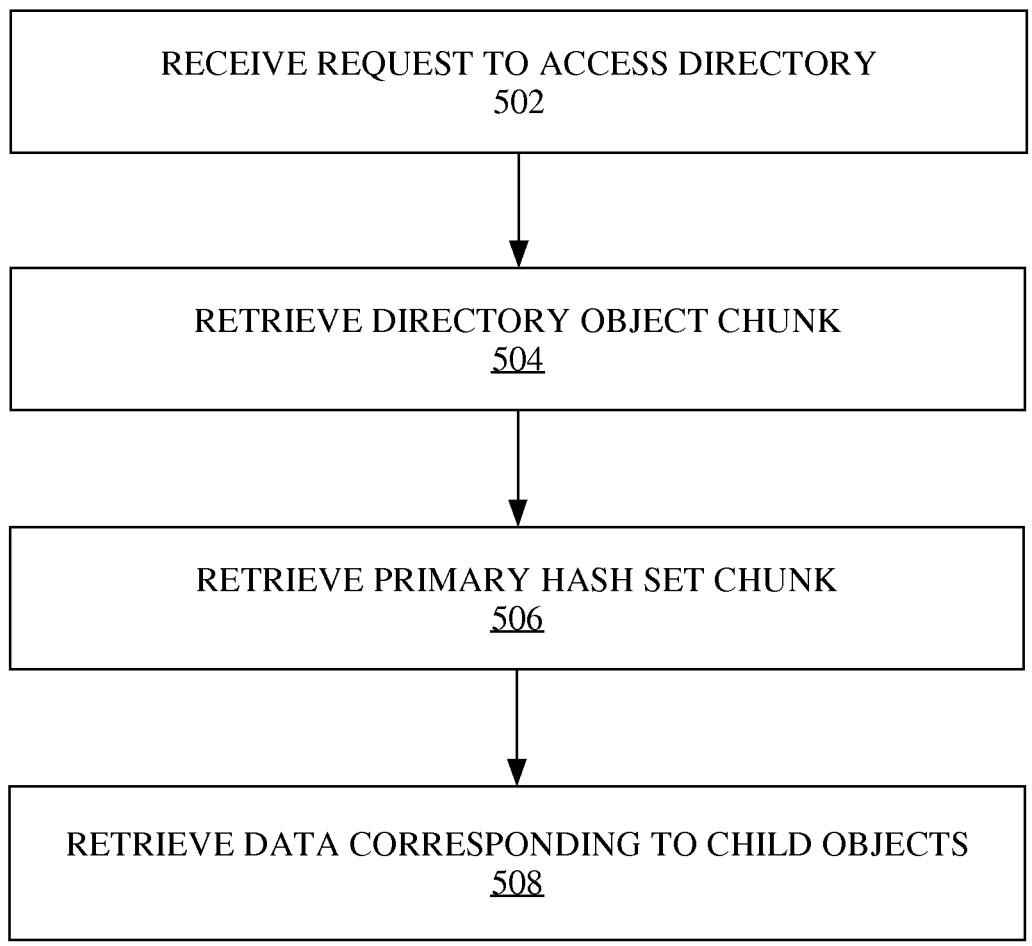
FIG. 5 is a flowchart illustrating an embodiment of a method for accessing a directory.

FIG. 5 is a flowchart illustrating an embodiment of a method for accessing a directory. The method may be performed on the server side, such as by chunk store server 112. The method may also be performed on the client side, such as by chunk system client 110.

At block 502, a request to access a directory is received. The request may include a hash value for a directory object chunk associated with the directory, such as directory object chunk 300. Alternatively and/or in addition, the request may include the directory name, a file system volume associated with the directory, the hash value for a parent object chunk in a file system hierarchy, or any other data that may be used to obtain the hash value for the associated directory object chunk or any other access key for the directory.

Processing continues to block 504, where a directory object chunk is retrieved from a content-addressable storage system. The directory object chunk is retrieved using the hash value for the directory object chunk.

Processing continues to block 506, where a primary hash set chunk, such as primary hash set chunk 320, is retrieved from the content-addressable storage system. The primary hash set chunk is retrieved using the hash value for the primary hash set chunk, which is stored in the directory object chunk (e.g. hash set chunk hash value 304).

Processing continues to block 508, where data corresponding to a set of child objects of the directory is retrieved. The data corresponding to the set of child objects is retrieved using hash values stored in the primary hash set chunk, such as hash values 324-328. The hash values may also be stored in a hierarchy of hash set chunks (e.g. hierarchy 400), where the primary hash set chunk is a root hash set chunk of the hierarchy.

Adding an Object to a Directory

Figure 6:
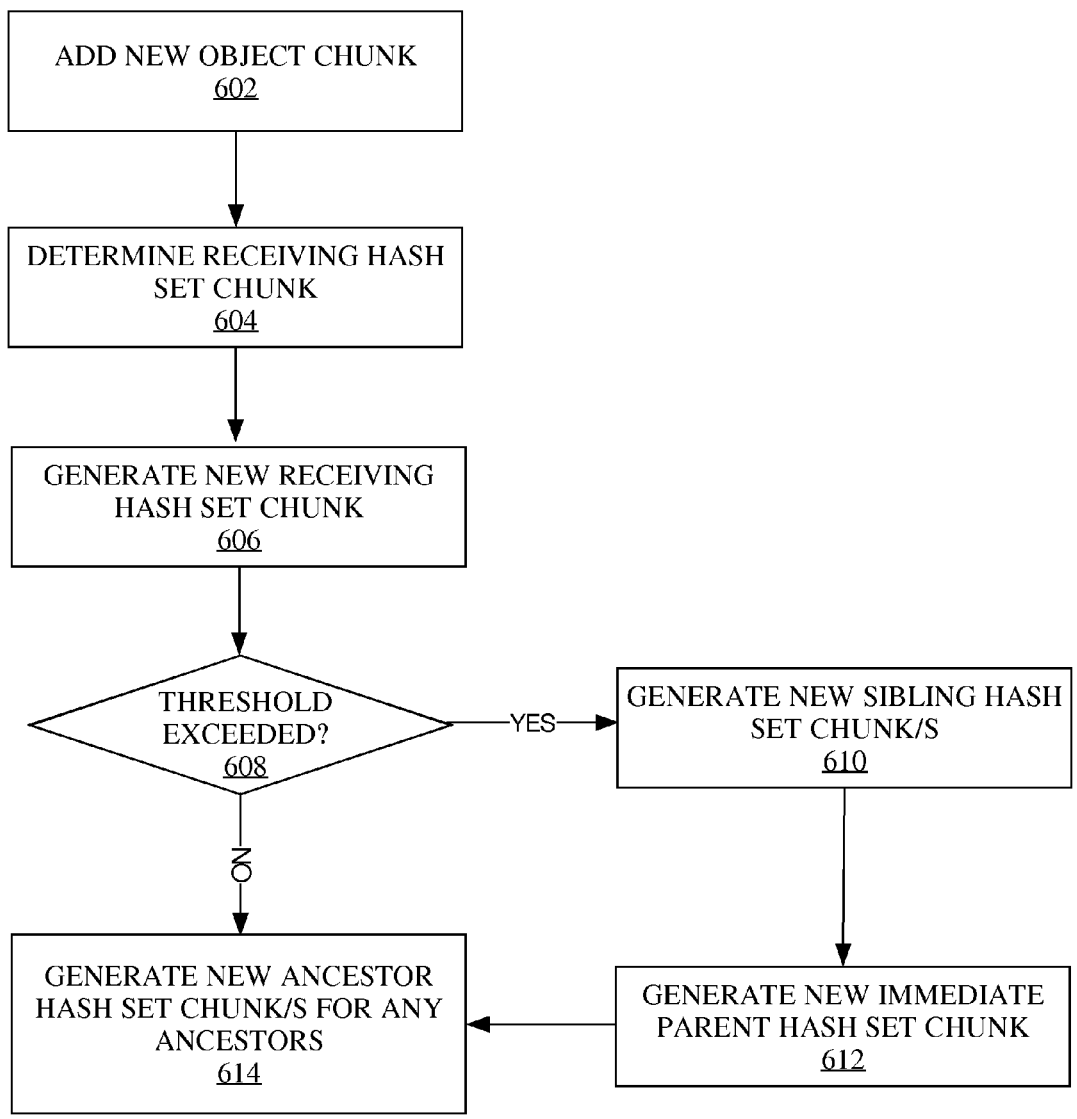
FIG. 6 is a flowchart illustrating an embodiment of a method for adding a new object to a directory.

FIG. 6 is a flowchart illustrating an embodiment of a method for adding a new child object to a directory. The method may be performed on the server side, such as by chunk store server 112. The method may also be performed on the client side, such as by chunk system client 110.

At block 602, a new object chunk is added to the content-addressable storage system. The new object chunk corresponds to a new child object of the associated directory.

Processing continues to block 604, where a specific hash set chunk is determined for storing the hash value for the new object chunk. The specific hash set chunk is selected from at least one hash set chunk storing the hash values for the child object chunks of the directory. For example, the specific hash set chunk may be selected from a hierarchy of hash set chunks.

Processing continues to block 606, where a new receiving hash set chunk is generated. The new receiving hash set chunk includes the hash value for the new object chunk. The new receiving hash set chunk may also include hash values contained in the specific hash set chunk. For example, the new receiving hash set chunk may include all hash values contained in the specific hash set chunk if the total number of hash values does not exceed a threshold value.

Processing continues to decision block 608, where it is determined whether a threshold value will be exceeded by adding a new hash value to the receiving hash set chunk. If the threshold value will be exceeded, processing continues to block 610. Otherwise, processing continues to block 614.

At block 610, at least one new sibling hash set chunk is generated. The at least one new sibling hash set chunk includes at least one hash value contained in the specific hash set chunk. The new receiving hash set chunk and the at least one new sibling hash set chunk reside at the same level of the hierarchy of hash set chunks.

Processing continues to block 612, where a new immediate parent hash set chunk is generated. The new immediate parent hash of chunk includes hash values for the at least one sibling hash set chunk and the new receiving hash set chunk.

Processing continues to block 614, where new ancestor hash set chunks are generated for any ancestors of the receiving hash set chunk. If a specific hash chunk was the primary hash set chunk, then no new ancestor hash set chunks need to be generated. The new ancestor hash set chunk/s each include a hash value for the new receiving hash set chunk or an ancestor thereof.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
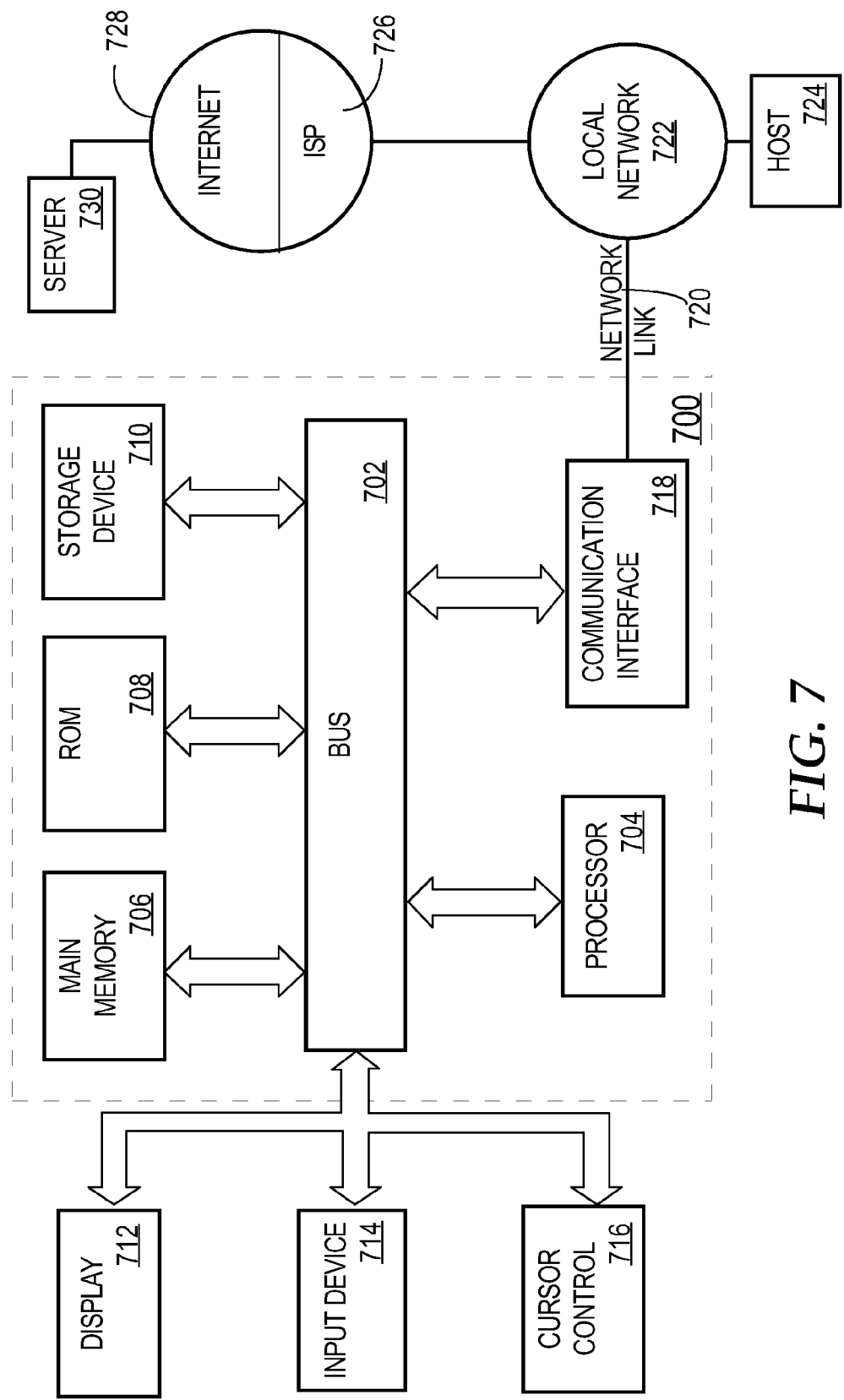
FIG. 7 illustrates a computer system upon which one or more embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
representing a directory structure of a file system using a plurality of chunks in a content-addressable storage system,
the directory structure comprising a set of objects arranged in an object hierarchy, wherein the set of objects includes a particular directory that has, within the object hierarchy, a set of child objects;
the plurality of chunks comprising:
a directory object chunk for the particular directory;
a particular set of child object chunks, wherein the particular set of child object chunks are object chunks for each child object in the set of child objects; and
at least one hash set chunk that includes hash values for object chunks in the particular set of child object chunks;
wherein the directory object chunk includes a hash value for a primary hash set chunk of the at least one hash set chunk.

2. The method of claim 1, further comprising:
retrieving the directory object chunk from the content-addressable storage system using a hash value for the directory object chunk;
retrieving the primary hash set chunk using the hash value for the primary hash set chunk stored in the directory object chunk;
retrieving data corresponding to the set of objects using hash values stored in the primary hash set chunk.

3. The method of claim 1, further comprising:
adding a new object chunk to the content-addressable storage system, the new object chunk corresponding to a new child object of the directory;
determining a specific hash set chunk of the at least one hash set chunk;
generating a new receiving hash set chunk comprising a hash value for the new object chunk and unmodified hash values for the specific hash set chunk;
if the specific hash set chunk is not the primary hash set chunk, generating at least one new ancestor hash set chunk comprising a hash value for the new receiving hash set chunk or an ancestor thereof, wherein the at least one new ancestor hash set chunk includes a new primary hash set chunk;
generating a new directory chunk comprising a hash value for the new primary hash set chunk;
wherein the directory is accessible using a hash of the new directory chunk.

4. The method of claim 3, wherein:
if a number of hash values in the receiving hash set chunk will exceed a threshold value:
generating a new sibling hash set chunk comprising at least one hash value contained in the specific hash set chunk;
generating a new immediate parent hash set chunk comprising a hash value for the new sibling hash set chunk and a hash value for the new receiving hash set chunk;
wherein the new receiving hash set chunk further comprises at least one remaining hash value contained in the specific hash set chunk.

5. The method of claim 4, wherein the threshold value is at least 16.

6. The method of claim 1,
wherein the at least one hash set chunk comprises a hierarchy of hash set chunks;
wherein the primary hash set chunk is a root hash set chunk that is an ancestor of all other hash set chunks in the hierarchy of hash set chunks;
each hash set chunk, of the hierarchy of hash set chunks, comprising a set of hash values,
wherein each hash value of the set of hash values is a hash value for either an object chunk in the particular set of child object chunks, or another hash set chunk in the hierarchy of hash set chunks.

7. The method of claim 6, further comprising:
retrieving the directory object chunk from the content-addressable storage system using a hash value for the directory object chunk;
retrieving the root hash set chunk using the hash value for the primary hash set chunk of the directory object chunk;
retrieving data corresponding to the set of objects by traversing the hierarchy of hash set chunks based on at least one set of hash values stored in the at least one hash set chunk.

8. The method of claim 6, further comprising:
adding a new object chunk to the content-addressable storage system, the new object chunk corresponding to the new object;
determining a specific hash set chunk of the at least one hash set chunk;
generating a new specific hash set chunk comprising a hash value for the new object chunk, and for any ancestor hash set chunk of the specific hash set chunk, generating a new ancestor hash set chunk comprising a hash value for the new specific hash set chunk or an ancestor thereof, wherein a new root hash set chunk is generated;
generating a new directory object chunk comprising a hash value for the new root hash set chunk;
wherein the directory is accessible using a hash value for the new directory chunk.

9. The method of claim 8, wherein:
if a number of hash values in the specific hash set chunk exceeds a threshold value:
generating a new sibling hash set chunk comprising at least one hash value contained in the specific hash set chunk;
generating a new immediate parent hash set chunk comprising a hash value for the new sibling hash set chunk and a hash value for the new specific hash set chunk;
wherein the new specific hash set chunk further comprises at least one remaining hash value contained in the primary hash set chunk.

10. The method of claim 1 wherein:
the set of objects further comprises a second directory that has, within the object hierarchy, a second set of objects comprising a second set of child objects;
wherein the particular set of child object chunks comprises a second directory object chunk for the second directory;
the plurality of chunks further comprising:
a second set of child object chunks for each child object in the second set of child objects; and
a hierarchy of hash set chunks associated with the second directory, comprising a particular root hash set chunk that is an ancestor of all other hash set chunks of the hierarchy of hash set chunks;
each hash set chunk, of the hierarchy of hash set chunks, comprising a set of hash values, wherein each hash value of the set of hash values is a hash value for either an object chunk in the second set of child object chunks, or another hash set chunk in the hierarchy of hash set chunks;

wherein the second directory object chunk includes a hash value for the particular root hash set chunk.

11. The method of claim 1, wherein the plurality of chunks further comprises at least one name index chunk comprising a set of name mappings, wherein each name mapping maps a hash value for a name associated with a particular chunk of the content-addressable storage system to a hash value for the particular chunk;

wherein the set of name mappings includes a mapping for each object of the set of objects;

wherein the directory chunk further comprises a hash value for a selected name index chunk of the at least one name index chunk.

12. The method of claim 11, wherein the at least one name index chunk comprises a hierarchy of name index chunks;

wherein the selected name index chunk is a root name index chunk that is an ancestor of all other name index chunks in the hierarchy of name index chunks.

13. A non-transitory computer-readable medium storing instructions which, when executed by one or more processors, cause performance of a method comprising:

representing a directory structure of a file system using a plurality of chunks in a content-addressable storage system, the directory structure comprising a set of objects arranged in an object hierarchy, wherein the set of objects includes a particular directory that has, within the object hierarchy, a set of child objects;

the plurality of chunks comprising:

a directory object chunk for the particular directory;

a particular set of child object chunks, wherein the particular set of child object chunks are object chunks for each child object in the set of child objects; and at least one hash set chunk that includes hash values for object chunks in the particular set of child object chunks.

14. The non-transitory computer-readable medium of claim 13, the method further comprising:

retrieving the directory object chunk from the content-addressable storage system using a hash value for the directory object chunk;

retrieving the primary hash set chunk using the hash value for the primary hash set chunk stored in the directory object chunk;

retrieving data corresponding to the set of objects using hash values stored in the primary hash set chunk.

15. The non-transitory computer-readable medium of claim 13, the method further comprising:

adding a new object chunk to the content-addressable storage system, the new object chunk corresponding to a new child object of the directory;

determining a specific hash set chunk of the at least one hash set chunk;

generating a new receiving hash set chunk comprising a hash value for the new object chunk and unmodified hash values for the specific hash set chunk;

if the specific hash set chunk is not the primary hash set chunk, generating at least one new ancestor hash set chunk comprising a hash value for the new receiving hash set chunk or an ancestor thereof, wherein the at least one new ancestor hash set chunk includes a new primary hash set chunk;

generating a new directory chunk comprising a hash value for the new primary hash set chunk;

wherein the directory is accessible using a hash of the new directory chunk.

16. The non-transitory computer-readable medium of claim 15, wherein:

if a number of hash values in the receiving hash set chunk will exceed a threshold value:

generating a new sibling hash set chunk comprising at least one hash value contained in the specific hash set chunk;

generating a new immediate parent hash set chunk comprising a hash value for the new sibling hash set chunk and a hash value for the new receiving hash set chunk;

wherein the new receiving hash set chunk further comprises at least one remaining hash value contained in the specific hash set chunk.

17. The non-transitory computer-readable medium of claim 16, wherein the threshold value is at least 16.

18. The non-transitory computer-readable medium of claim 13, wherein the at least one hash set chunk comprises a hierarchy of hash set chunks;

wherein the primary hash set chunk is a root hash set chunk that is an ancestor of all other hash set chunks in the hierarchy of hash set chunks;

each hash set chunk, of the hierarchy of hash set chunks, comprising a set of hash values, wherein each hash value of the set of hash values is a hash value for either an object chunk in the particular set of child object chunks, or another hash set chunk in the hierarchy of hash set chunks.

19. The non-transitory computer-readable medium of claim 18, the method further comprising:

retrieving the directory object chunk from the content-addressable storage system using a hash value for the directory object chunk;

retrieving the root hash set chunk using the hash value for the primary hash set chunk of the directory object chunk;

retrieving data corresponding to the set of objects by traversing the hierarchy of hash set chunks based on at least one set of hash values stored in the at least one hash set chunk.

20. The non-transitory computer-readable medium of claim 18, the method further comprising:

adding a new object chunk to the content-addressable storage system, the new object chunk corresponding to the new object;

determining a specific hash set chunk of the at least one hash set chunk;

generating a new specific hash set chunk comprising a hash value for the new object chunk, and for any ancestor hash set chunk of the specific hash set chunk, generating a new ancestor hash set chunk comprising a hash value for the new specific hash set chunk or an ancestor thereof, wherein a new root hash set chunk is generated;

generating a new directory object chunk comprising a hash value for the new root hash set chunk;

wherein the directory is accessible using a hash value for the new directory chunk.

21. The non-transitory computer-readable medium of claim 20, wherein:
if a number of hash values in the specific hash set chunk exceeds a threshold value:
generating a new sibling hash set chunk comprising at least one hash value contained in the specific hash set chunk;
generating a new immediate parent hash set chunk comprising a hash value for the new sibling hash set chunk and a hash value for the new specific hash set chunk;
wherein the new specific hash set chunk further comprises at least one remaining hash value contained in the primary hash set chunk.

22. The non-transitory computer-readable medium of claim 13, wherein:
the set of objects further comprises a second directory that has, within the object hierarchy, a second set of objects comprising a second set of child objects;
wherein the particular set of child object chunks comprises a second directory object chunk for the second directory;
the plurality of chunks further comprising:
a second set of child object chunks for each child object in the second set of child objects; and
a hierarchy of hash set chunks associated with the second directory, comprising a particular root hash set chunk that is an ancestor of all other hash set chunks of the hierarchy of hash set chunks;
each hash set chunk, of the hierarchy of hash set chunks, comprising a set of hash values, wherein each hash value of the set of hash values is a hash value for either an object chunk in the second set of child object chunks, or
another hash set chunk in the hierarchy of hash set chunks;
wherein the second directory object chunk includes a hash value for the particular root hash set chunk.

23. The non-transitory computer-readable medium of claim 13,
wherein the plurality of chunks further comprises at least one name index chunk comprising a set of name mappings, wherein each name mapping maps a hash value for a name associated with a particular chunk of the content-addressable storage system to a hash value for the particular chunk;
wherein the set of name mappings includes a mapping for each object of the set of objects;
wherein the directory chunk further comprises a hash value for a selected name index chunk of the at least one name index chunk.

24. The non-transitory computer-readable medium of claim 23,
wherein the at least one name index chunk comprises a hierarchy of name index chunks;
wherein the selected name index chunk is a root name index chunk that is an ancestor of all other name index chunks in the hierarchy of name index chunks.

* * * * *